United States Patent
Hoek et al.

(10) Patent No.: US 8,004,425 B2
(45) Date of Patent: Aug. 23, 2011

(54) BLIND SPOT DETECTION SYSTEM AND METHOD USING PREEXISTING VEHICULAR IMAGING DEVICES

(75) Inventors: Steven G. Hoek, Holland, MI (US); Mark W. Newton, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 12/570,786

(22) Filed: Sep. 30, 2009

(65) Prior Publication Data
US 2010/0073480 A1  Mar. 25, 2010

Related U.S. Application Data

(63) Continuation-in-part of application No. 11/609,669, filed on Dec. 12, 2006, now Pat. No. 7,696,903, which is a continuation-in-part of application No. 10/393,000, filed on Mar. 20, 2003, now Pat. No. 7,148,813.

(60) Provisional application No. 60/815,433, filed on Jun. 21, 2006.

(51) Int. Cl.
*G08G 1/16* (2006.01)
(52) U.S. Cl. ........ 340/903; 340/904; 340/937; 340/435; 340/436
(58) Field of Classification Search .................. 340/908, 340/904, 903, 937, 425.5, 435, 436; 700/300, 700/301
See application file for complete search history.

(56) References Cited

U.S. PATENT DOCUMENTS

| | | | |
|---|---|---|---|
| 4,104,562 A | 8/1978 | DiCola | |
| 5,289,321 A | 2/1994 | Secor | |
| 5,457,449 A | 10/1995 | Kuning et al. | |
| 5,635,902 A | 6/1997 | Hochstein | |
| 5,935,190 A | 8/1999 | Davis et al. | |
| 6,046,686 A | 4/2000 | Mitchell et al. | |
| 6,222,462 B1 | 4/2001 | Hahn | |
| 6,243,644 B1 | 6/2001 | Dengler | |
| 6,559,774 B2 | 5/2003 | Bergan et al. | |
| 6,570,998 B1 | 5/2003 | Ohtsuka et al. | |
| 6,625,300 B1 | 9/2003 | Kyo | |
| 6,737,964 B2 | 5/2004 | Samman et al. | |
| 7,049,945 B2 * | 5/2006 | Breed et al. | 340/435 |
| 7,190,281 B2 * | 3/2007 | Nagasawa et al. | 340/903 |
| 7,355,524 B2 | 4/2008 | Schofield | |
| 7,696,903 B2 * | 4/2010 | Stam et al. | 340/907 |
| 2003/0095043 A1 | 5/2003 | Butzer et al. | |
| 2008/0291275 A1 | 11/2008 | Hubert et al. | |
| 2009/0147083 A1 | 6/2009 | Pawlicki et al. | |

* cited by examiner

*Primary Examiner* — Anh V La
(74) *Attorney, Agent, or Firm* — Price Heneveld LLP

(57) ABSTRACT

A vehicular blind spot detection system (700) for alerting a driver of a motor vehicle to an object in the vehicle's blind spot, the system includes a first imaging device (707) used typically used to control vehicle lighting and that works to detect objects substantially forward of the vehicle and a second imaging device (709) typically used with a rear camera display (RCD) for detecting objects substantially rearward of the vehicle. A control unit (711) is coupled to the first imaging device (707) and second imaging device (709) that includes a graphic processing unit (713) for processing images captured by the first imaging device (707) and second imaging device (709) for detecting an optical flow of objects within the images so as to discriminate between vehicles and other objects entering the driver's blind spot.

20 Claims, 8 Drawing Sheets

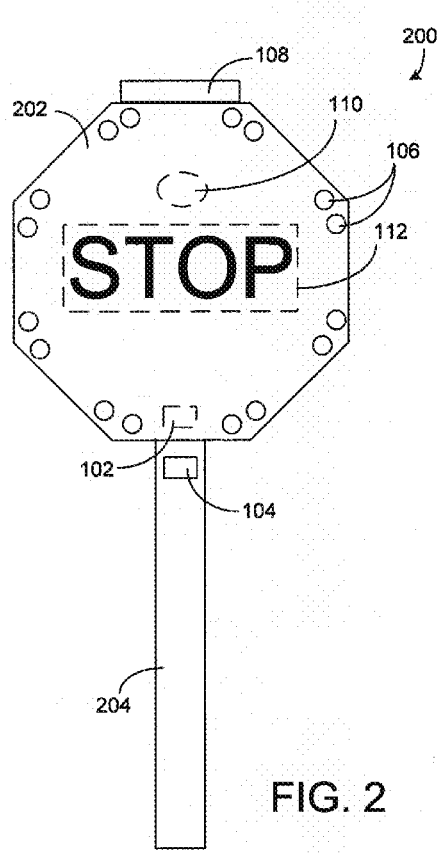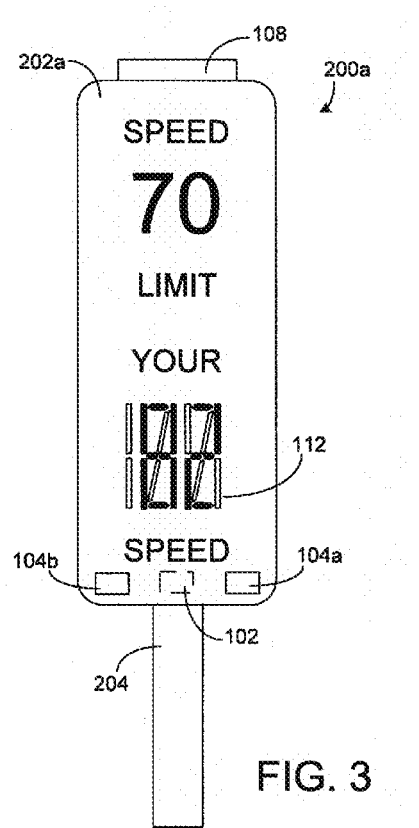
FIG. 2
FIG. 3

US 8,004,425 B2

BLIND SPOT DETECTION SYSTEM AND METHOD USING PREEXISTING VEHICULAR IMAGING DEVICES

FIELD OF THE INVENTION

The present invention relates generally to vehicular blind spot detection and more particularly to detecting blind spots using rear mounted and front facing imaging devices.

BACKGROUND OF THE INVENTION

A blind spot monitor is a vehicle-based sensor system that detects other vehicles located to the driver's side and rear. Warnings can be visual or audible where increased warnings can indicate potentially hazardous lane changes. The detection of other vehicles in a driver's blind spot has typically been achieved both mechanically and electrically. Differing types of reflective mirrors have been used both inside and outside a vehicle for enhancing the driver's view so as to detect objects in the vehicles' blind spot. Electrical implementations for blind spot monitoring have included milliwave radar and rearward backing cameras located on the vehicle's outside mirrors, however, each of these systems are complex often requiring retrofit to existing vehicles.

BRIEF DESCRIPTION OF THE DRAWINGS

FIG. 2 is a diagram of a traffic control device that includes a traffic sign, particularly a stop sign, a sensor, a light source and a control unit;

FIG. 3 is a diagram of a traffic control device that includes a traffic sign, particularly a speed limit sign, a sensor, a display and a control unit;

Figure 1:
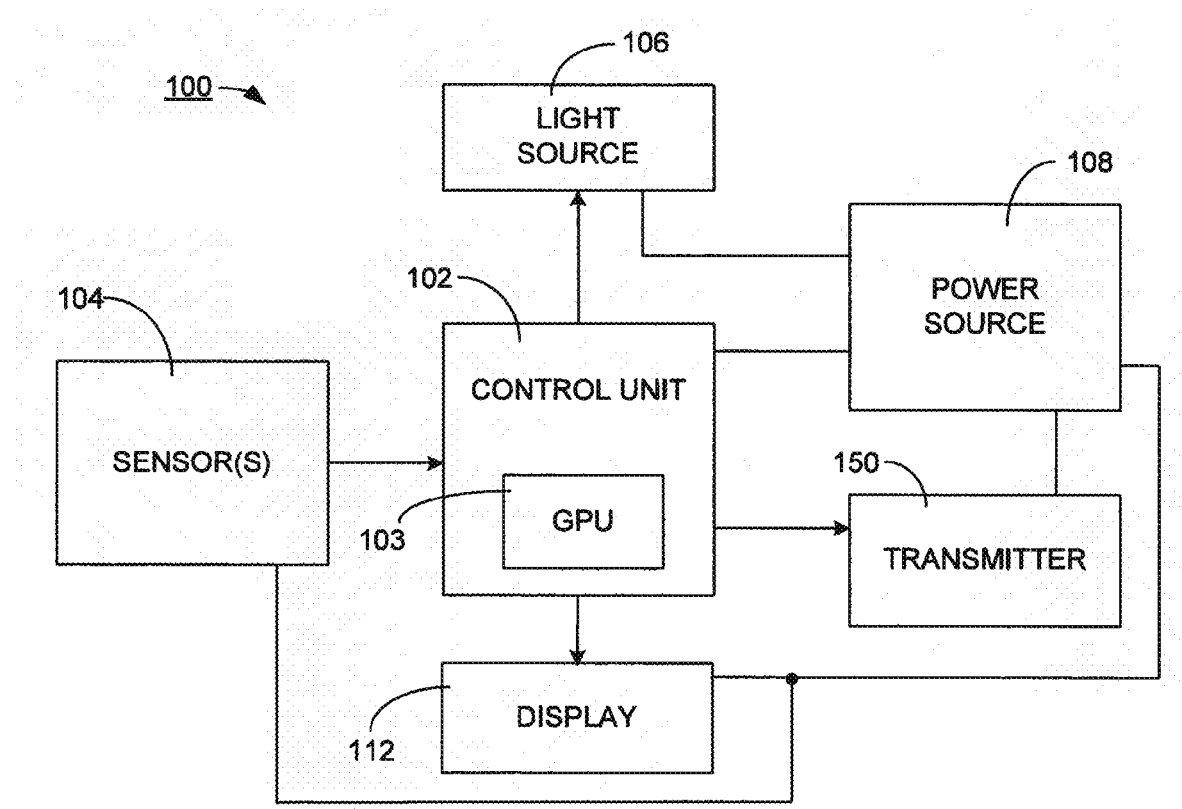
FIG. 1 is an electrical block diagram of a traffic system for alerting a driver of a motor vehicle to an associated traffic sign.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

In the implementation of any traffic system, a designer must generally contend with issues of economics and environment. Mass-produced intelligent interactive vehicular signage has the potential to make a two-stop sign intersection nearly as safe as a conventional traffic light, which may cost fifty times as much, with less wasted time of drivers at the intersection, less wasted gasoline and less driver frustration. Seen another way, mass-produced interactive signs with intelligence can cost effectively be used in ten to one hundred times more locations as conventional signs and signals, potentially saving tens of thousands of lives and hundreds of thousands of injuries and vehicular collisions.

According to one embodiment of the present invention, a driver approaching a sign is not alerted if their vehicle is performing in accordance with the sign. If, for instance, a driver's speed is within prescribed limits and a sensor indicates that a vehicle is slowing properly for a stop sign, then there is little reason to flash lights or otherwise distract a driver who obviously sees the stop sign. By the same token, if a vehicle is traveling within specified limits on a highway, there is little reason to use emitted light to draw a driver's attention to a speed limit sign that the driver is obviously obeying. The idea is to avoid alerting a driver when all is okay. This also conserves energy and preserves a driver's peace of mind, avoiding nuisance warnings when there is no need.

On the other hand, if a driver is not slowing appropriately and is unlikely to stop for a stop sign, then a flashing light focused on the driver of the oncoming vehicle may optionally grow even more intense and flash more rapidly as it becomes clear that the driver does not see the sign and has little chance to stop appropriately. By the same token, if a speed limit sign indicates 70 mph and an oncoming vehicle is going 90 mph, then a focused signal may become more aggressive as danger increases.

That is, one aspect of the invention is to not bother drivers if they are performing properly and only attract driver attention when there is a safety need that is likely to result in an unsafe driving situation. The idea of putting the intelligence in the sign and not in the vehicle is another aspect of the invention. Putting intelligence in the vehicle is not a bad idea, but only the newest vehicles will have it. Putting intelligence in the sign itself means every vehicle that passes will benefit. Putting intelligence in every vehicle on the road is a somewhat impractical task, whereas putting intelligence in the signage benefits everyone, regardless of the age or cost of a vehicle. In addition, vehicles get old and eventually are junked, whereas intelligence in the signage generally has a much longer life with far greater economic and environmental efficiency for society.

An optional extension of this concept is to incorporate additional sensors for environmental factors that can affect safety, such as day, night, ice, snow, fog, temperature, rain, traffic density, etc. By using a reconfigurable display on the traffic sign, the driving instructions shown on the traffic sign can be adjusted based on environmental safety factors, with an attendant adjustment by the control circuit of the warning signal light to the approaching vehicle. The traffic sign then becomes increasingly intelligent with each technological advance.

Thus, the present invention is directed to a traffic system and method for alerting a driver of a motor vehicle to a traffic sign. The traffic system detects a motor vehicle and illuminates one or more light source(s) that are attached to the traffic sign responsive to one or more detected motor vehicle(s). According to one embodiment, the system is capable of determining whether the motor vehicle is approaching the traffic sign and only illuminating the light source(s) when the detected motor vehicle is approaching the traffic sign. This conserves power and, in situations where the traffic system is implemented with rechargeable batteries, can advantageously extend the operating life of the traffic system.

An even more energy-conserving control and sensor technique is to sense a vehicle's speed and/or rate of change of speed to make the decision to illuminate the light source(s) on the signage only if the approaching vehicle is not performing within appropriate safety parameters. In this manner, the light signal is only transmitted to the oncoming vehicle when the vehicle is performing outside of prescribed safety criterion required for the purpose of the signage. The aggressiveness of the signal emitted from the sign may be commensurate with the degree to which the vehicle is performing outside the desired safety criterion, and more aggressive signaling can be achieved by raising intensity and/or flash rate. Various types of sensors may be utilized to detect the motor vehicle, such as one or more of the following: a light sensor, an image sensor, a color enhanced image sensor, a passive infrared sensor (PSIR) radar sensor, an image intensified sensor, a stereoscopic image sensor, an IR emitter/receiver sensor, a twin PSIR sensor (using a first PSIR sensor for ambient and a second PSIR sensor aimed at the oncoming vehicle) and multiple light sensors aimed in different directions to balance out effects of ambient light. One optional light sensor is disclosed in U.S. Pat. No. 6,359,274, which is hereby incorporated herein by reference in its entirety.

In one embodiment, the plurality of light sources includes a plurality of light emitting diodes (LEDs) formed in an array. Suitable high-power LEDs are disclosed in U.S. Pat. No. 6,335,548, which is hereby incorporated herein by reference in its entirety. In another embodiment, a power source for powering the sensor, the control unit and the plurality of light sources is provided by a rechargeable battery that receives energy from a solar panel or photovoltaic module.

Turning to FIG. 1, a control unit 102, e.g., including a microcontroller and/or an optional graphic processing unit (GPU) 103, is coupled to a sensor 104, a light source 106, a display 112, when implemented, and an optional transmitter 150. The control unit 102, the sensor 104, the light source 106, transmitter 150, and the display 112, if implemented, receive power from a power source 108, which may include a solar panel that provides a recharging current to a rechargeable battery. The sensor 104 may be of a variety of types, depending upon the implementation, such as a light sensor, which detects light provided by the lighting system of an approaching motor vehicle, or may include a radar sensor, such as a Doppler radar transceiver, which is capable of determining whether a vehicle is approaching or receding from the sensor and/or determining speed and distance.

If a light sensor is utilized, it is preferable that the control unit 102 measures an ambient light level so as to select a threshold level to compare to the light level sensed at any particular instant. Such an ambient light level may be attained as an average level over a specified time interval. By setting a variable threshold as a function of the ambient light level, the control unit 102 may prevent the light sources from being inadvertently illuminated due to bright sunlight. Additionally, the threshold or a second threshold may be used to discriminate between headlights of approaching vehicles and tail lights of receding vehicles. Alternatively, discrimination between such vehicles may be accomplished by limiting the field of view of the sensor to that in which approaching vehicles are expected or using one or more optical filters, such as a red light blocking filter. The light source 106 may also take a variety of forms, e.g., a multi-colored LED array of one or more incandescent bulbs. Alternately, the sign of FIG. 2 may not contain light emitters 106 but may contain only one focused light module 110 aimed at the driver of the oncoming vehicle for most efficient use of energy. One or more additional light sources may be incorporated in the signage as an auxiliary warning where the auxiliary light source(s) are aimed to alert non-offending vehicles of danger. For instance, with a two-way stop intersection, the main goal is to alert drivers approaching the stop sign to come to a full stop, but a secondary goal may be to energize amber warning lights to through traffic that there is imminent danger that a stop sign will be run, thus, allowing non-offending vehicles to slow or stop to avoid a crash.

FIG. 2 depicts an exemplary traffic sign 202, i.e., a stop sign, which forms a part of a traffic control device 200. It should be appreciated that the present invention may be advantageously implemented within any number of different traffic signs. The traffic sign 202 is coupled to and supported by a post 204 in a conventional manner. Alternatively, the sign may be attached to a number of other support structures. As is shown in FIG. 2, the sign 202 includes a plurality of light sources 106 along an outer periphery of the sign 202. Alternatively, or in addition to, the lights 106 may form a part of the traffic direction, e.g., the word "stop" or the display 112 may be implemented to provide the traffic direction. Further, the sign 202 may not contain light emitters 106 but may contain only one focused light module 110 aimed at the driver of the oncoming vehicle for most efficient use of energy. As is also shown in FIG. 2, a sensor 104 is attached to the post 204. However, it should be appreciated that the sensor 104 may be combined within the traffic sign 202 or located at various other positions.

When the power source 108 includes a solar panel and a rechargeable battery, the power source 108 may be located along a top of the traffic sign 202 or otherwise oriented to receive light from the sun. A control unit 102 is coupled to the sensor 104 and the light source 106 and receives power from the power source 108. Responsive to a motor vehicle detection signal provided by the sensor 104, the control unit 102 may cause the light sources 106 and/or 110 to intermittently turn off and on, i.e., flash at a desired rate. The control unit 102 may also be configured to alter the flash rate and light intensity in response to the degree of danger posed by the oncoming vehicle.

In another embodiment of the present invention, sensor 104 is an image sensor and control unit 102 performs segmentation on the images captured by the image sensor. "Segmentation" is the conventional term in image processing to refer to identifying particular objects within an image and extracting them from the background. Common techniques such as edge detection, region continuity, template correlation, or the generalized Hough transform are typically used to perform segmentation for other applications. Proprietary algorithms such as "Patmax" available in software produced by Cognex Corporation provide improved methods of segmentation which are invariant to the scale or rotation of an object within an image. A detailed discussion of the common methods used for segmentation and the extraction of features in an image is given in the book "Feature Extraction & Image Processing" by Mark Nixon and Alberto Aguado (2002), which is hereby incorporated in its entirety by reference.

A very powerful, but computationally intensive, algorithm that may be used in processing and segmentation of sequential images (e.g., video) received from image sensor 104 is called "Optical Flow." Optical flow determines the motion vector of one or more pixels between two images. A famous algorithm for computing optical flow is the Horn-Schunk algorithm Details of optical flow computation are described in Robot Vision by Berthold Klaus Paul Horn (1986), the entire disclosure of which is hereby incorporated by reference. Many other algorithms have been developed since then, some of which are more appropriate for different scenarios and some of which trade computational efficiency for performance.

If optical flow is computed between two images, objects in motion may be readily separated from the background with high robustness. Background objects will have no motion and thus no optical flow. Objects of interest, those in motion (such as approaching vehicles), can be extracted by having an optical flow vector of some threshold magnitude. For more robustness, an edge detection algorithm (or other single image segmentation means) can be applied along with optical flow to better segment pixels of objects, which both have motion distinct from the background and which are part of an edge or other significant feature.

The measurement of optical flow can be utilized to effectively implement the smart stop sign application mentioned above. With an image sensor 104 mounted onto the stop sign 202 in the general direction of traffic approaching the sign, images are acquired and the optical flow between two images is computed. If no traffic is present, the optical flow across the image will be zero. If traffic is approaching image sensor 104, some of the pixels will exhibit optical flow and the vehicle can be detected by segmenting the object in the image based upon its optical flow and other edge properties. Once segmented, the width of the object may be computed. The width of the object in the image will vary by the tangent of the distance to the object. By monitoring this width, the percent deceleration of the oncoming vehicle can be determined.

Although it may not be possible to determine the exact distance to the vehicle with a single camera (without knowing the vehicle's actual width), this distance can be approximated by assuming the average width of a vehicle is between 1.5 and 2 meters. The resulting error from such an assumption is believed acceptable for this application. Furthermore, if sufficient resolution is provided in the image sensor, the actual distance can be more accurately determined by computing the height of the lowest portion of the vehicle in the image, i.e., where the rubber hits the road. This point will correspond to the pixels lowest in the image, which exhibit optical flow. Furthermore, these pixels will have downward optical flow since the position of the lower portion of the vehicle will be moving downward in the image as the vehicle approaches. The distance to the vehicle is computed as the tangent of the angle from horizontal of the lowest point of the vehicle divided by the height off the road of the camera. By monitoring this distance, the velocity and deceleration of the vehicle can be determined and, if the vehicle is not decelerating properly, a warning flash may be initiated from the sign.

The computation of optical flow can be demanding—especially on high-resolution images. Although many modifications of the algorithm have been proposed, many computational operations are performed for any pixel of interest. The computational demands of computing optical flow in real time (for example, at 30 frames per second) would make vision systems quite expensive. However, modern Graphics Processing Units (GPUs) can be used as part of control unit 102 to effectively compute optical flow and other intense image processing algorithms very efficiently and cost effectively. GPUs are typically used in computer graphics adapters to accelerate performance of CAD and video gaming applications where a tremendous amount of three-dimensional graphic computations are preformed in a highly parallel fashion. Image processing algorithms such as optical flow, edge detection, and other filters can also be highly parallelized with the same computations being done on different pixels simultaneously. GPUs are thus highly appropriate for the image processing computations to be performed for the present invention and can provide much higher performance at a much lower cost than conventional processors or DSPs. GPUs are commercially available from NVIDIA Corporation of Santa Clara, Calif. and ATI Technologies Inc., of Markham, Ontario, Canada. Information about programming GPUs can be found on these vendors' Internet web sites or on independent web sites such as gpgpu.org and openvidia.org.

The use of a GPU also allows for more efficient processing of stereo video images. With a stereo vision system, two laterally spaced-apart image cameras (image sensors) are used. The actual distance to an object can be triangulated by comparing the relative location in the images from each camera. Stereo vision techniques are well understood for other applications and are documented in the previously mentioned Horn reference.

In a stereo vision application, objects may first be identified in at least one of the images using segmentation techniques as described above (potentially enhanced using optical flow information). Next, the objects in the image from one camera 104a may be correlated to objects in the image from the second camera 104b. A correlation filter may be used to compare a template block of pixels from the first image to identically sized blocks of pixels in the second image. The block is compared with pixels in the second image at the same coordinates as the first image and also to blocks in the second image offset from the original coordinates. The block in the second image exhibiting the best correlation identifies the location of the object in the second image. The difference in pixel coordinates between the correlated blocks in each image is then used to compute the exact distance to the object in the image. Again, by using optical flow background objects can be removed completely and thus the correlation filter will only need to be implemented on regions of interest. Even so, the correlation of several objects between a stereo pair of images is computationally intense, but as it involves parallel computations on several pixels, it is implemented efficiently on a GPU 103.

In another application of the present invention, a vision system 100 may be positioned to monitor the speed of traffic for speed limit enforcement. Such a system may be permanently mounted, or temporarily placed, near a road (FIG. 3) or it may be contained in a police patrol car (FIGS. 4, 5A, and 5B) for monitoring other traffic. Using vision systems for speed limit enforcement has two distinct advantages: it is completely undetectable by any means such as a radar detector since no signals are emitted, and a visual recording may be made of the monitored vehicle to provide an additional record to clear up any ambiguity over the traffic infraction. A highly effective traffic speed detection system, such as may be used to replace police radar, can thus be implemented using the above technique. Two image sensors 104a and 104b may be placed spaced apart and fixed at a roadside location such as on a permanent or temporary speed limit sign or a mobile trailer with a speed limit sign/display for unattended operation. FIG. 3 depicts an exemplary traffic sign 202a, i.e., a speed limit sign, which forms a part of a traffic control device 200a. In this case, display 112 may be an electronically reconfigurable segmented display for displaying the speed of an approaching vehicle.

Figure 4:
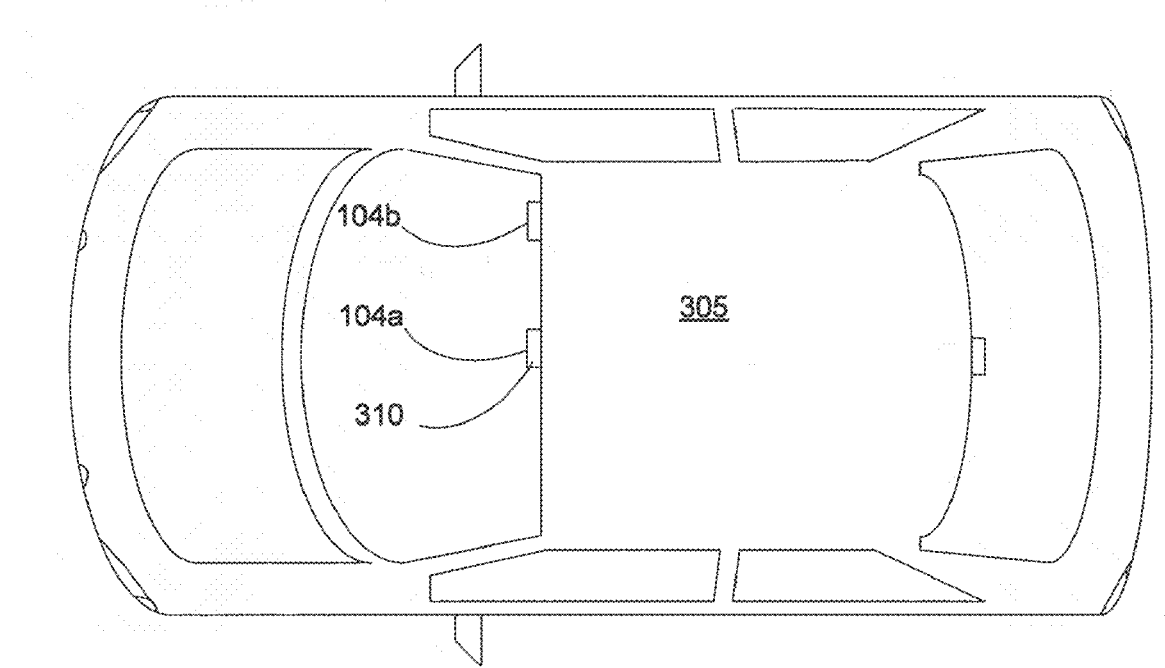
FIG. 4 is a diagram of a vehicle in which is mounted at least some of the components of a speed monitoring system of the present invention.
Figure 5A:
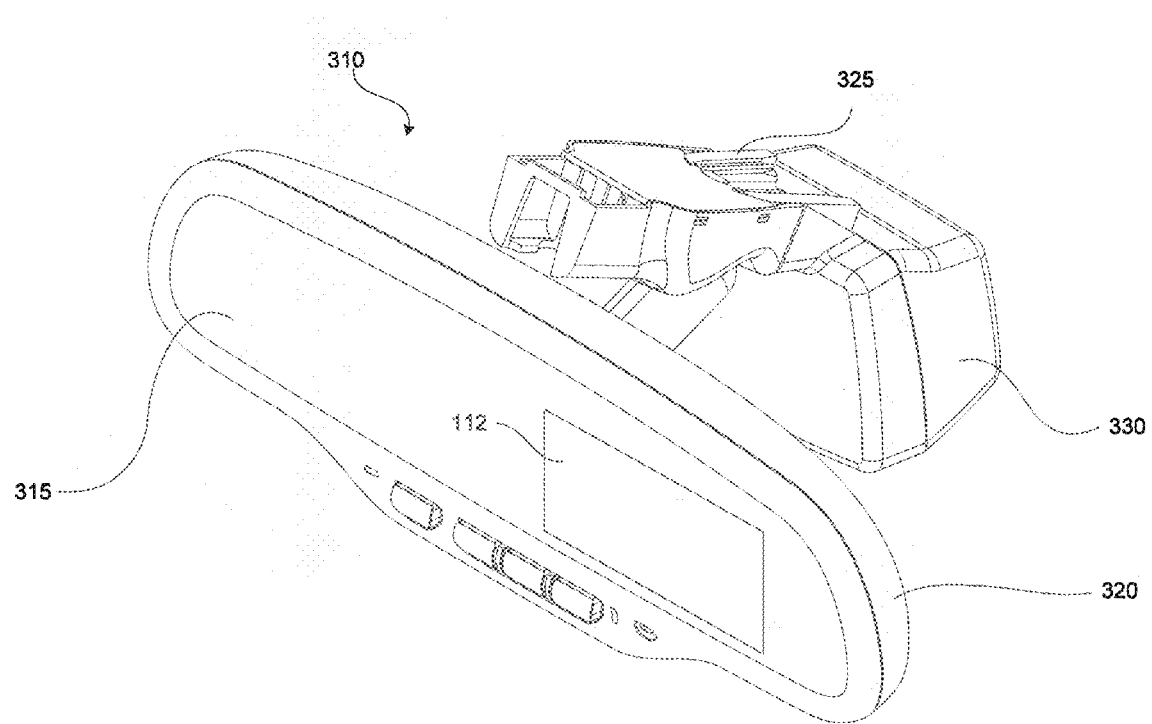
FIG. 5A is a perspective view of a front of a rearview mirror that may be used in the vehicle shown in FIG. 4 as a mounting platform for at least some of the components of the speed monitoring system of the present invention.
Figure 5B:
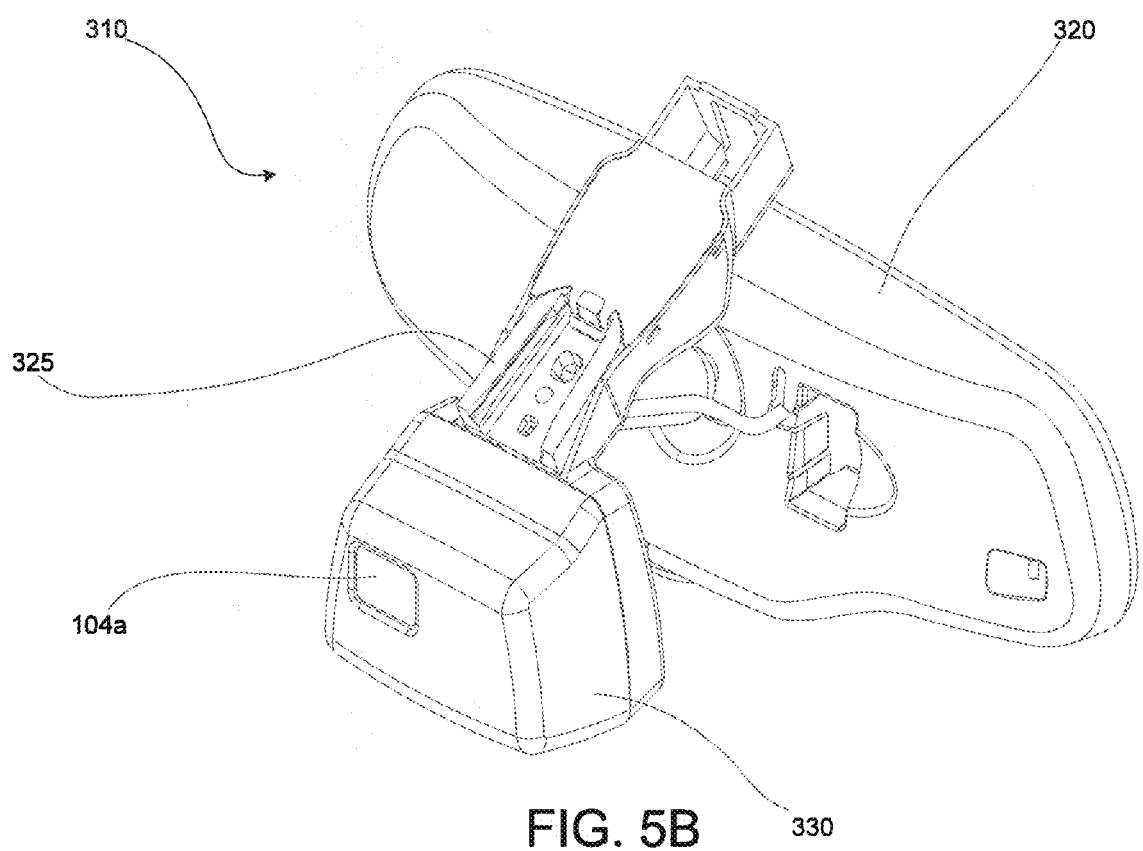
FIG. 5B is a perspective view of a rear of the rearview mirror shown in FIG. 5A.

As shown in FIG. 4, the cameras 104a and 104b may also be mounted in a patrol car 305 looking through the front windshield or other suitable location (FIG. 4). The first image sensor or camera 104a may be mounted in a rearview mirror assembly 310 while the second image sensor or camera 104b may be mounted on or proximate the windshield laterally spaced from mirror assembly 310. As shown in more detail in FIGS. 5A and 5B, rearview mirror assembly 310 may include a mirror mounting bracket 325 for mounting the assembly to the windshield or to the vehicle roof. A mirror housing 320 is pivotably mounted to bracket 325. A mirror 315 is mounted in housing 320 along with a display 112 that may be mounted behind mirror 315 to show therethrough, or may be mounted adjacent mirror 315. Mirror 315 may be transflective such that the display cannot be seen when it is turned off, but can be seen when turned on. Examples of mirror and display combinations are disclosed in U.S. Pat. Nos. 6,356,376 and 6,700,692 and in U.S. Provisional Patent Application No. 60/804,351, the entire disclosures of which are incorporated herein by reference.

The mirror assembly 310 may further include a second housing 330 attached to the mirror mounting bracket 325. Image sensor 104a may be mounted in second housing 330 so as to look forwardly through the vehicle windshield. Details of various constructions of an image sensor mount are disclosed in U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316, 6,774,988, and 6,861,809; in U.S. Patent Publication No. 2004/0201483; and U.S. Provisional Patent Application Nos. 60/404,879, 60/394,583, and 60/590,736, the entire disclosures of which are incorporated herein by reference.

The ideal placement of the cameras 104a and 104b will depend on the resolution of the cameras and the desired distance at which a vehicle will be detected. For example, 1920×1080 resolution cameras are used (approximately 2 megapixels) for a 30 degree field of view, and it is desirable to measure the speed of a vehicle at 500 meters away. Furthermore, for accurate detection, there is ideally a 2 pixel displacement between the images of the tracked object in the image. In this case, angle between the two cameras and a 500 meter object should be approximately 0.03 degrees. To achieve this, the cameras should be spaced apart by 25 centimeters (about 10 inches). Of course, different camera resolutions with different spacing may be used to achieve the desired performance specification.

The present invention provides several advantages when used for speed detection. Vision recognition is completely passive and thus is undetectable. It is envisioned that a display could be provided showing one of the two images with an overlay showing the detected speed of each vehicle in the image. This alone is a significant advantage over radar systems capable of measuring only one car at a time. Visual queues, such as a red-yellow-green indicator overlay, may identify speeding vehicles. The display may be a touch screen, allowing the police officer to touch on an object in the image to zoom in or receive more detailed information. Since both the distance to the vehicle and the angle between the vehicle and the sensing system are known, the speed in the actual direction of travel of the vehicle may be determined, thus the patrol vehicle may be oriented at any angle to the monitored traffic. Finally, a visual and data record may be stored on a hard drive or other recording means to allow a review of the infraction should there be any ambiguity. Recording may be continuous or initiated by the officer.

It is envisioned that the speed monitoring system may be placed in a patrol car in the vicinity of the rear view mirror. The cameras may be placed high on the windshield but within the windshield wiper path. A video display may be provided in the same vicinity, potentially replacing the rear view mirror. In this case, a rearward facing camera may be provided to replace the mirror function. The driver may then choose between the rearward camera view and the view from the speed detection cameras. It is also envisioned that the speed function camera may perform other functions, such as recognizing the license plates of other cars. A record may be kept of license plates identified by optical character recognition (OCR) and the speed of the vehicles. In states or countries where it is allowed, traffic tickets may be issued automatically to the registrant of a vehicle. Additionally, license plate numbers of stolen vehicles or vehicles belonging to suspects may be downloaded into the system. If a corresponding license plate number is identified during general driving of the patrol car, the officer may be alerted to the presence of the vehicle.

Figure 6:
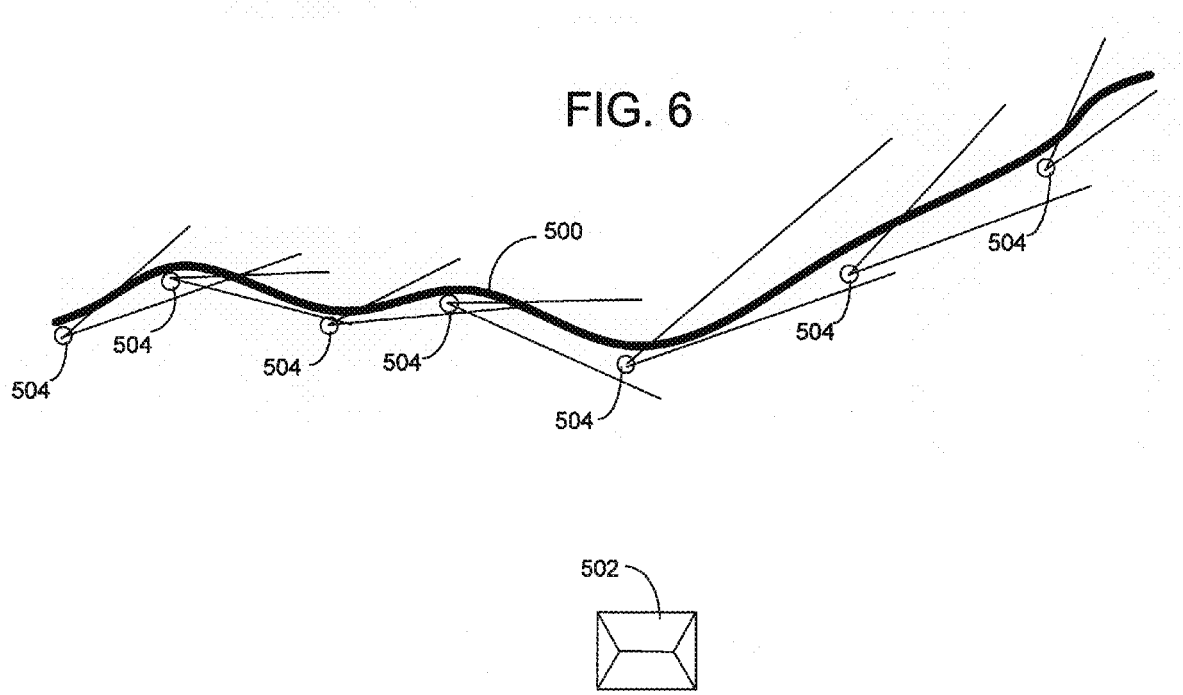
FIG. 6 is top plan view of a border monitoring system constructed in accordance with an embodiment of the present invention.

Another application of the system 100 of the present invention is to use it in a border patrol system. As shown in FIG. 6, a plurality of border monitoring devices 504 may be disposed along a border. Each border monitoring device 504 comprises an image sensor (used interchangeably as "camera") 104, a control unit 102, and a power source 108 (FIG. 1). Optionally, each device 504 may include a wireless (e.g., RF) transmitter 150 and/or a light source 106 as explained further below. The image sensors may be aimed along the border with overlapping fields of view so as to combine to capture images along the border and in the near vicinity of the border so as to detect any objects approaching the border. The image sensors 104 may be constructed to have a very high resolution, with very good lenses and a narrow field of view so as to clearly detect objects over a very long distance to cover a very large swath with each image sensor 104. A corresponding control unit 102 may be coupled to each image sensor 104 to detect moving objects in a similar manner to how vehicles are detected in the above embodiments. More specifically, a GPU 103 may be provided in control unit 102 to monitor the optical flow of any objects in the captured images. If a moving object is detected, an alarm signal may be transmitted to a monitoring post 502 where a border patrol person may view the images from the image sensor that detects the movement.

The monitoring post may be equipped with several display monitors corresponding to the number of image sensors that the monitoring post is responsible for monitoring. Detection of motion in the images from one of the image sensors could trigger an alarm (visual and/or audio) that would prompt the border patrol person to watch the corresponding display monitor. The system may thus provide the advantage of alerting border patrol personnel when someone is trying to break through. Alternatively, a lesser number of display monitors may be provided at the monitoring post such that images are only displayed from an image sensor if there was motion detected within the captured images. In fact, the image signals from the image sensors may not even be transmitted to the monitoring post unless there is motion detected. This provides the advantage of a system that is very convenient and very fast responding so that it can essentially do very little unless there is movement detected. Further, the system can be actively monitoring while operating at a minimum current draw—or even sampling at a minimum current draw—and then when motion is detected, it would wake itself up and send a picture or a constant stream of pictures to the monitoring post. In addition, by only transmitting images when motion is detected, the labor requirement associated with operating the system is significantly reduced—namely, people would not need to watch display monitors all the time, but would only need to watch when there was a need to watch. This not only reduces the number of personnel needed to watch the display monitors, but it also eliminates much of the tediousness of constantly watching display monitors where nothing is happening most of the time.

In the border monitoring system, power source 108 may include a solar panel so that the monitoring devices may be readily positioned and moved without requiring wiring. The monitoring devices could also be covertly hidden to reduce the likelihood of tampering or trying to avoid detection. The monitoring devices could also be permanently positioned by securing them in a housing that is partially positioned in a deep hole with a cement anchor. The monitoring devices may further include a light source 106 that may emit infrared radiation to assist with nighttime detection while not necessarily alerting potential trespassers.

It should be appreciated that the present invention can be incorporated within any number of different types of traffic signs, e.g., a stop sign, a yield sign, a speed limit sign, a railroad crossing sign, a school sign, a curve sign, among other such signs. Accordingly, a traffic control device has been described herein, which detects a vehicle and alerts a driver of the vehicle to the presence of the traffic sign by periodically illuminating a plurality of light sources. Illumination of the light sources upon detection of a motor vehicle can be particularly advantageous to a driver who is unfamiliar with the area in which they are driving or in bringing to the attention of the driver of the motor vehicle the presence of a traffic sign, which is otherwise obstructed from view.

Figure 7:
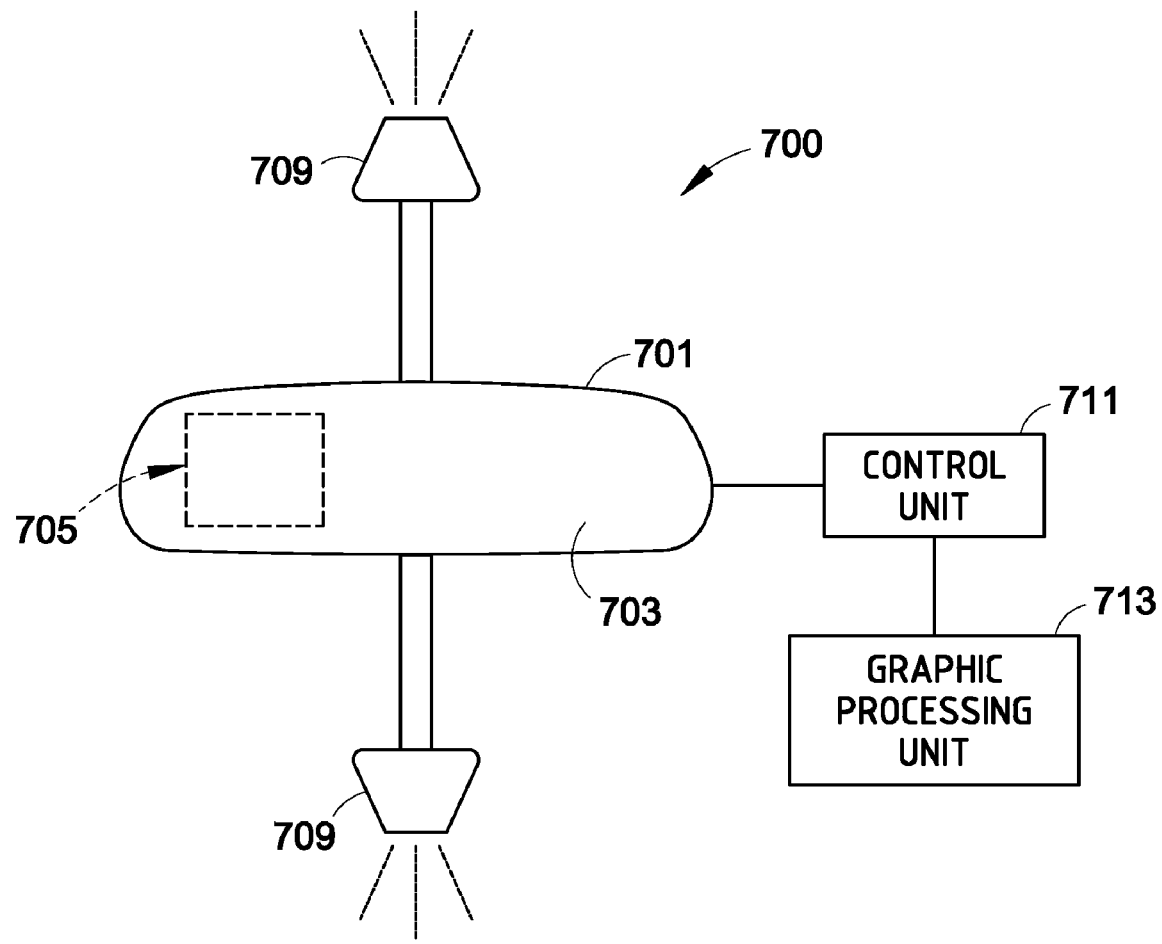
FIG. 7 is a top plan view of a mirror as used within the vehicle displaying objects in a vehicle's blind spot in accordance with an embodiment of the present invention.

In accordance with another embodiment of the invention, FIG. 7 illustrates a rear view mirror as used in accordance with the vehicular blind spot detection system. The mirror system 700 includes a rearview mirror assembly 701 that is typically used by the driver inside the vehicle. The rearview mirror assembly 701 includes a mirror element 703 and one or more liquid crystal display (LCD) units incorporated or positioned within the mirror assembly 701. The LCD units allow text, graphical and video information to be displayed to the driver. A front imaging device 707 such as a camera, typically used to control vehicle lighting and other driver assist functions, is used to detect vehicles that are entering or within the vehicles blind spot. The front imaging device may be attached to the interior review view mirror and is like that used with the SMART BEAM lighting control system manufactured by Gentex Corporation described in commonly assigned U.S. Provisional Patent Application Nos. 60/900,588, 60/902,728 and 61/008,762; U.S. Patent Publication Nos. 2008/0192132, 2009/0160987, and 2009/0190015; and U.S. patent application Ser. No. 12/082,215, the disclosures of each of the above are incorporated in their entireties herein by reference. Further, detailed descriptions of such automatic vehicle exterior light control systems are described in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316, 6,774,988, 6,861,809, and 6,895,684; U.S. Patent Publication No. 2004/0201483; and U.S. Provisional Patent Application Nos. 60/404,879 and 60/394,583, the disclosures of which are also incorporated herein in their entireties by reference. Also, commonly assigned U.S. Provisional Application Nos. 60/780,655 and 60/804,351 and U.S. Patent Publication Nos. 2008/0068520 and 2009/0096937 describe various displays for use with the present invention. The entire disclosures of each of these applications are also incorporated herein by reference Similarly, a rear imaging device 709 or camera is typically used in a rear camera display (RCD) system and other driver assist functions and is often positioned substantially near the vehicle's rear license plate mounting area. The RCD system is used for displaying video information to the driver when the vehicle is operated in reverse for detecting persons and/or objects to the rear of the vehicle and visually displaying this information to the driver. An RCD system is described in commonly assigned U.S. Patent Publication Nos. 2008/0284447 and 2003/0103141 and U.S. Pat. Nos. 6,550,949 and 6,550,949, which are all herein incorporated by reference in their entireties. A control unit 711 and graphic processing unit 713 are used to store, process and/or interpret video data and control information from the front imaging device 707 and rear imaging device 709 which may be used singly or in combination for detecting the optical flow of vehicles and/or other obstacles moving in and out of a respective field of view. As described herein, the blind spot detection system 700 works to detect vehicles entering the driver's blind spot for alerting the driver of this type of hazard.

Figure 8:
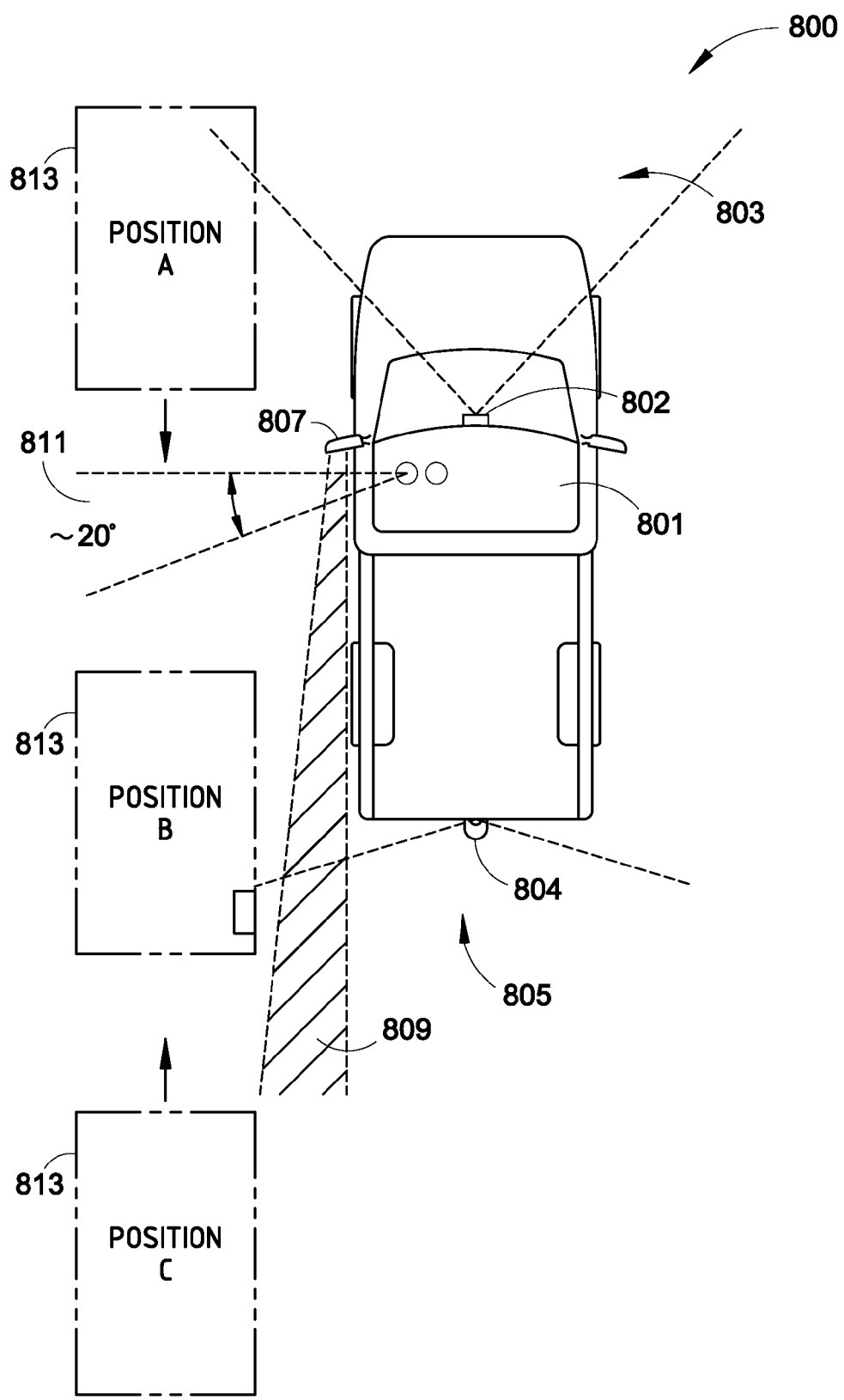
FIG. 8 is a top view of other vehicles detected within the vehicles' blind spot in accordance with an embodiment of the present invention.

FIG. 8 is a top view illustrating vehicles detected within the driver's blind spot in accordance with an embodiment of the present invention. The vehicular blind spot detection system 800 includes a vehicle 801 that can be improved through the use of a blind detection device formed using one or more preexisting imaging devices used with the vehicle for lighting control and rear camera display. Thus, the invention has the advantage of creating a driver's blind spot detector without adding additional imaging devices or camera systems to the vehicle. Although an automobile is shown by way of example, it will be evident to those skilled in the art that other types of vehicles could be used as well.

As described with regard to FIG. 7, the vehicle includes a front facing camera system generally positioned at the rear of an automobile rearview mirror assembly located within the vehicle. The front facing camera system provides a viewing angle of approximately 60 degrees like that shown by viewing field 803. Similarly, the rear facing camera system provides a viewing angle of approximately 120-190 degrees as shown by the field 805. The driver's left side outside mirror also provides its own conical-like expanded field of view shown by field 809 using a glass mirror element. The driver's field of view when looking forward only will be approximately 20 degrees from a line extending parallel to and rearward of the driver's position in the vehicle. The side view field 811 illustrates the typical field of view that where objects could be detected by a forward facing driver.

As seen in FIG. 8, when vehicle 813 shown at position A enters the viewing field 803 the optical flow resulting from vehicle motion is detected by the forward facing camera 802 typically used in connection with headlight control. In circumstances when the vehicle 801 is faster in speed and/or vehicle 813 is slower in speed such the vehicle 801 overtakes vehicle 813. Hence, the vehicle 813 will move into the driver's blind spot at position B. When vehicle 813 is in position B, the driver will be alerted either through an visual annunciation in the rearview mirror display and/or through the use of an audible signal for alerting the driver to the hazard. Similarly, if the vehicle 813 is in position C and detected by the RCD camera 804 where vehicle 813 is entering into field 805, when the vehicle 801 is slower in speed and/or vehicle 813 is faster in speed such the vehicle 813 moves into the driver's blind spot at position B, the driver will also alerted to the hazard. Accordingly, the blind spot detector system will alert the driver since vehicle 813 presumably will not be visible to the driver when in the driver's blind spot. As noted herein, an advantage of the present invention is that the blind spot detection system 800 works with preexisting front camera imaging system typically used for vehicle headlight control as well as the rear camera imaging system used for displaying obstacles at the rear of the vehicle. When these cameras are used in combination, the blind spot detection system uses principals of optical flow for determining vehicle movement in typical road traffic conditions to alert the driver for vehicles in the driver's blind spot.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A vehicular blind spot detection system for alerting a driver of a motor vehicle to an object in the vehicle's blind spot, the system comprising:
   a first imaging device used to control vehicle headlights for detecting objects substantially forward of the motor vehicle;
   a second imaging device for detecting objects substantially rearward of the vehicle; and
   a control unit coupled to the first imaging device and second imaging device that includes a graphic processing unit for processing images captured by the first imaging device and second imaging device for detecting an optical flow of objects within the images so as to discriminate between vehicles and other objects entering a driver's blind spot.

2. A vehicular blind spot detection system as in claim 1, wherein the detected optical flow comprises determining a motion vector of one or more pixels between two images.

3. A vehicular blind spot detection system as in claim 1, wherein the first imaging device is attached to a rear view mirror.

4. A vehicular blind spot detection system as in claim 1, wherein the vehicle lighting includes headlights.

5. A vehicular blind spot detection system as in claim 1, wherein the second imaging device is used with a rear camera display (RCD).

6. A vehicular blind spot detection system as in claim 1, wherein the second imaging device is positioned substantially near the vehicle's rear license plate.

7. A vehicular blind spot detection system as in claim 1, wherein the first imaging device and second imaging device are also used for other driver assist functions.

8. A vehicular blind spot detection system as in claim 1, wherein the first imaging device and second imaging device are complementary metal-oxide semiconductor (CMOS) imaging devices.

9. A vehicle blind spot detection system comprising:
   a first sensor for capturing images forward of the vehicle;
   a second image sensor for capturing sequential images of approaching traffic; and
   a control unit coupled to the first image sensor and second image sensor, the control unit comprising a graphic processing unit coupled to the first image sensor and second image sensor for processing images captured by the first image sensor and second image sensor to detect optical flow of objects within the images so as to discriminate between vehicles and other objects, the control unit detecting a speed of travel of each vehicle from sequential images.

10. A vehicle blind spot detection system as in claim 9, wherein the detected optical flow comprises determining a motion vector of one or more pixels between two images.

11. A vehicle blind spot detection system as in claim 9, wherein the first image sensor is attached to a rear view mirror.

12. A vehicle blind spot detection system as in claim 9, wherein the second image sensor is used with a rear camera display (RCD).

13. A vehicle blind spot detection system as in claim 9, wherein the first image sensor and second image sensor includes a first camera used to control vehicle lighting and a second camera used with a rear camera display (RCD).

14. A vehicle blind spot detection system as in claim 13, wherein the first camera faces substantially forward of the vehicle and the second camera faces substantially rearward of the vehicle.

15. A vehicular blind spot detection system as in claim 9, wherein the first imaging device and second imaging device are complementary metal-oxide semiconductor (CMOS) imaging devices.

16. A blind spot detection system for monitoring activity along a vehicular border, the system comprising:
   at least one monitoring device each comprising:
      a first image sensor for capturing images along and in the vicinity of a first field of view forward of the vehicle;
      a second image sensor for capturing images along and in the vicinity of a second field of view rearward of the vehicle;
      a control unit coupled to the first image sensor and second image sensor for processing the captured images and detecting moving objects in the captured images and, when a moving object is detected, causing a signal to be transmitted to alert a driver indicating that motion has been detected in the vehicle's blind spot; and
      wherein the control unit comprises a graphic processing unit coupled to the image sensor for processing images captured by the image sensor for detecting an optical flow of objects within the images so as to discriminate between moving objects and non-moving objects in a vehicle's blind spot.

17. A blind spot detection system as in claim 16, wherein the detected optical flow comprises determining a motion vector of one or more pixels between two images.

18. A blind spot detection system as in claim 16, wherein the first image sensor is used to control vehicular lighting.

19. A blind spot detection system as in claim 16, wherein the second image sensor is used with a rear camera display (RCD).

20. A vehicular blind spot detection system as in claim 16, wherein the first imaging device and second imaging device are complementary metal-oxide semiconductor (CMOS) imaging devices.

* * * * *

UNITED STATES PATENT AND TRADEMARK OFFICE
CERTIFICATE OF CORRECTION

| | | |
|---|---|---|
| PATENT NO. | : 8,004,425 B2 | Page 1 of 1 |
| APPLICATION NO. | : 12/570786 | |
| DATED | : August 23, 2011 | |
| INVENTOR(S) | : Hoek et al. | |

It is certified that error appears in the above-identified patent and that said Letters Patent is hereby corrected as shown below:

Cover Page
Delete "Related U.S. Application Data" in its entirety.

Column 4
Line 65, "algorithm Details" should be -- algorithm. Details --.

Signed and Sealed this

Fifteenth Day of November, 2011

David J. Kappos
*Director of the United States Patent and Trademark Office*